US008666331B2

(12) United States Patent
Carmon

(10) Patent No.: US 8,666,331 B2
(45) Date of Patent: Mar. 4, 2014

(54) CASCADING BASEBAND PROCESSORS

(75) Inventor: Rafael Carmon, Rishon Lezion (IL)

(73) Assignee: Broadcom Corporation, Irvine, CA (US)

( * ) Notice: Subject to any disclaimer, the term of this patent is extended or adjusted under 35 U.S.C. 154(b) by 132 days.

(21) Appl. No.: 13/369,436

(22) Filed: Feb. 9, 2012

(65) Prior Publication Data

US 2013/0208769 A1 Aug. 15, 2013

(51) Int. Cl.
  *H04B 1/40* (2006.01)
(52) U.S. Cl.
  USPC ............... 455/84; 455/73; 455/39; 455/91; 455/103
(58) Field of Classification Search
  USPC ............ 455/73, 39, 84, 91, 103, 161.2, 164.2
  See application file for complete search history.

(56) References Cited

U.S. PATENT DOCUMENTS

| | | | |
|---|---|---|---|
| 5,964,880 A * | 10/1999 | Liu et al. ..................... | 713/401 |
| 6,172,975 B1 * | 1/2001 | Sallee .......................... | 370/359 |
| 7,774,530 B2 * | 8/2010 | Haug et al. .................. | 710/110 |
| 2002/0118201 A1 | 8/2002 | Mukherjee et al. | |

FOREIGN PATENT DOCUMENTS

WO   2005/101677 A1   10/2005

OTHER PUBLICATIONS

European Search Report in co-pending, related European Application No. 12005868.0, mailed Jun. 12, 2013.

* cited by examiner

*Primary Examiner* — Tuan Pham
(74) *Attorney, Agent, or Firm* — Thomas | Horstemeyer, LLP

(57) ABSTRACT

Cellular processors are cascaded to provide different configurations, which result in higher-capacity base stations, increased numbers of simultaneous users over one frequency band, and/or aggregation of several carriers while still using only one radio frequency (RF) chipset. The processors are aligned in both time and frequency, with each processor having a data port that allows data exchange with the other processors. The data alignment and exchange allow the processors, in the aggregate, to act as a single unit, resulting in a scalable architecture that can accommodate different system configurations.

19 Claims, 9 Drawing Sheets

CASCADING BASEBAND PROCESSORS

BACKGROUND

1. Field of the Disclosure

The present disclosure relates generally to cellular base stations and, more particularly, to cascading baseband processors.

2. Description of Related Art

Numerous cellular base stations exist, which use the same radio access technology (RAT), such as 3G, time-division spatial code-division multiple access (TD-SCDMA), high-speed packet access (HSPA), dual-carrier HSPA (DC-HSPA), LTE, etc. These base stations can have different capacities to accommodate a different number of simultaneous users, different bandwidth (BW), different numbers of transmit (TX) antennas, different numbers of receive (RX) antennas, etc. As cellular technology becomes more ubiquitous, cellular operators are planning and deploying networks with a wide of range of base stations which are of different sizes and capabilities.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
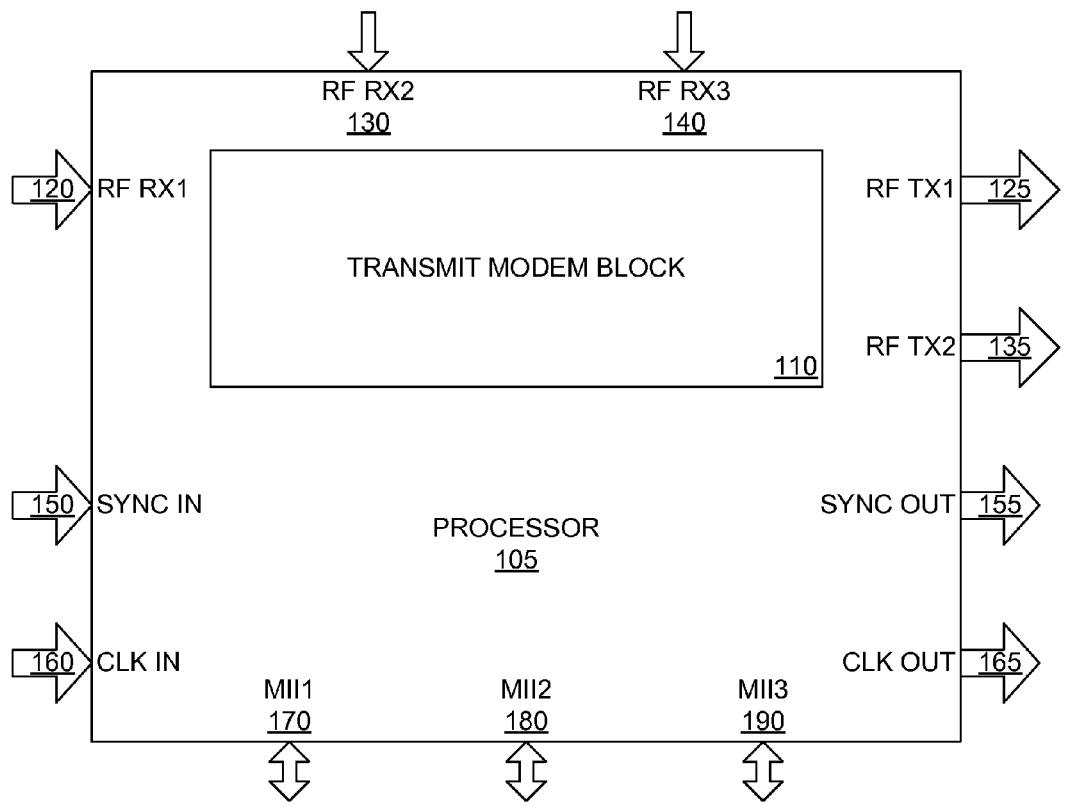
FIG. 1 is a diagram showing one embodiment of a baseband processor comprising a transmit modem block.

Cellular base stations that use the same radio access technology (RAT (e.g., 3G, TD-SCDMA, HSPA, DC-HSPA, LTE, etc.) can have different capacities to accommodate different numbers of simultaneous users, different bandwidths (BW), different numbers of transmit (TX) and/or receive (RX) antennas, etc. As such, it is not a trivial task, nor economically prudent, to design a different system for each possible configuration.

The systems and methods described herein, where processors are cascaded to provide different configurations. These different configurations result in higher-capacity base stations, increased numbers of simultaneous users over one frequency band, and/or aggregation of several carriers while still using only one radio frequency (RF) chipset. Some of these embodiments result in beneficial characteristics for certain RATs, such as DC-HSPA, Rel-9 HSPA, HSPA++, LTE-Advanced.

Briefly described, processors are aligned in both time and frequency, with each processor having a data port that allows data exchange with the other processors. The data alignment and exchange allow the processors, in the aggregate, to act as a single unit. The ability to cascade cellular baseband processors results in a scalable architecture that can accommodate different system configurations.

With this overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing one embodiment of a processor 105 comprising a transmit modem block 110. In a preferred embodiment, the processor 105 is a Broadcom® Celivero (or BCM 61680) chip.

As shown in FIG. 1, the processor 105 comprises three radio frequency (RF) receivers (RX) (which can be either analog or digital IQ) 120, 130, 140 and two RF transmitters (TX) 125, 135. The RF RX1 120, RF RX2 130, and RF RX3 140 provide over-the-air interfaces for RF data reception. Similarly, the RF TX1 125 and RF TX2, provide over-the-air interfaces for RF data transmission.

For some embodiments, the processor 105 further comprises a synchronization (SYNC) input (IN) 150, a SYNC output (OUT) 155, a clock (CLK) IN 160, and a CLK OUT 165. The SYNC IN 150 is configured to receive a SYNC signal (or several signals), which allows the processor 105 to synchronize its internal clock to the source of the SYNC signal, and the SYNC OUT 155 is configured to transmit a SYNC signal to other processors. Similarly, the CLK IN 160 is configured to receive a CLK signal, either from an external source or from another processor 105, thereby allowing the processor 105 to set its internal clock in accordance with the CLK signal. The CLK OUT 165 is configured to transmit a CLK signal to other processors 105 so that the other processors can synchronize or align their respective clocks to the CLK signal.

In the embodiment of FIG. 1, the processor 105 also comprises three data ports 170, 180 190, which are shown as media-independent interface (MII) ports. These MII1 170, MII2 180, and MII3 190 are preferably implemented as gigabit media access control (GMAC) ports.

Figure 2:
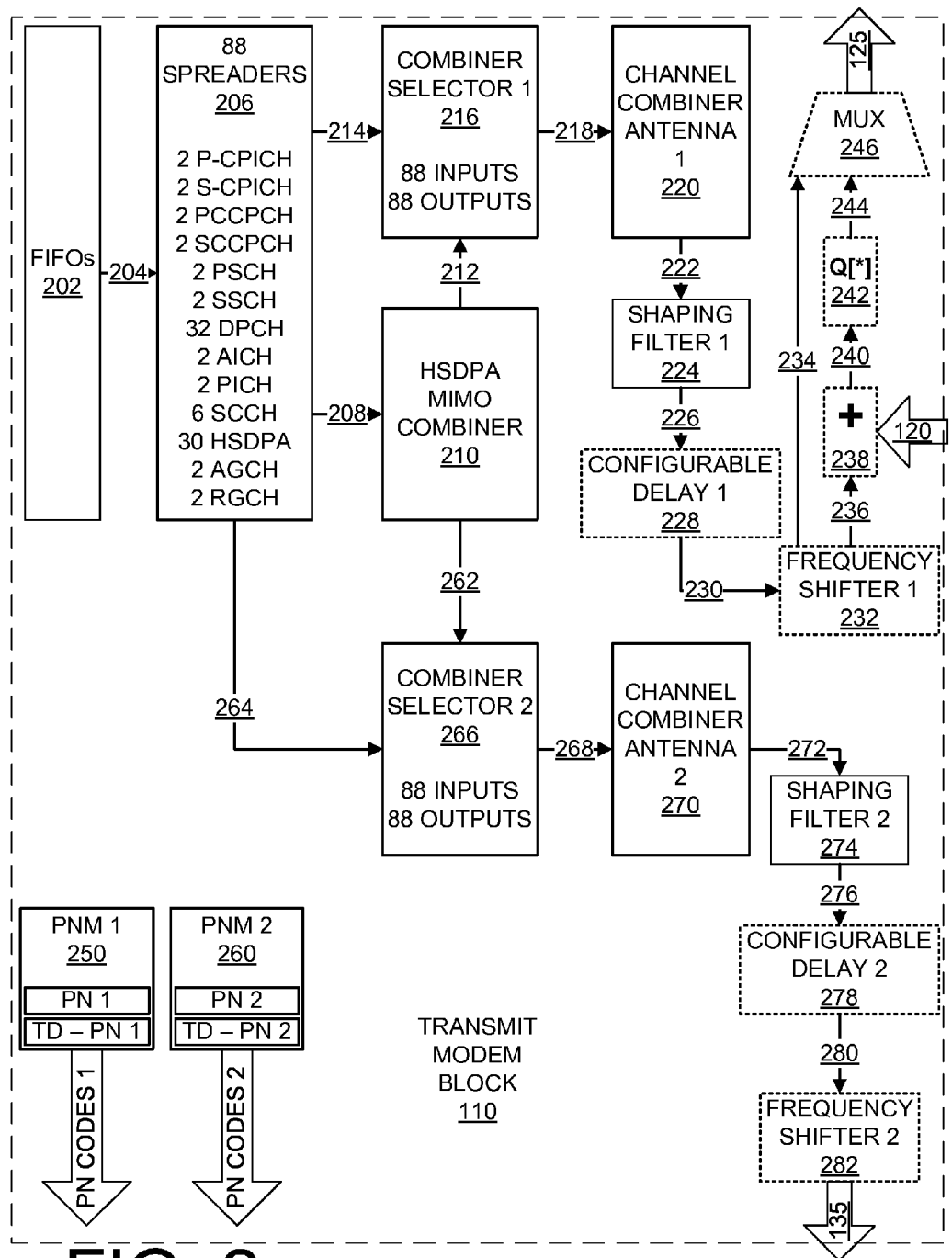
FIG. 2 is a diagram showing one embodiment of the transmit modem block of FIG. 1.

The processor 105 of FIG. 1 also comprises a transmit modem block 110, which is shown in greater detail with reference to FIG. 2. Specifically, FIG. 2 shows one embodiment having two pseudo-random noise (PN) modules (PNM1 250 and PNM2 260), which generate the PN codes for the modem data.

As shown in the embodiment of FIG. 2, the transmit modem block 110 comprises an array of first-in-first-out (FIFO) registers 202, which output to a bank of spreaders 206. In the embodiment of FIG. 2, there are 88 spreaders, including two primary common pilot indicator channels (P-CPICH), two secondary CPICH (S-CPICH), two primary common control physical channels (P-CCPC), two secondary CCPC (S-CCPC), two primary synchronization channels (P-SCH), two secondary SCH (S-SCH), 32 dedicated physical channels (DPCH), two acquisition indicator channels (AICH), two paging indicator channels (PICH), six shared control channels (SCCH), thirty high-speed downlink packet access (HSDPA), two absolute grant channels (AGCH), and two relative grant channels (RGCH).

The spreaders 206 provide inputs to two combiner selectors (first combiner selector 216 and second combiner selector 266), each of which has 88 inputs and 88 outputs that correspond to the 88 spreaders 206. The spreaders 206 also provide inputs to a HSDPA multi-input-multi-output (MIMO) combiner 210, which, in turn, provides input to the first combiner selector 216 and the second combiner selector 266.

The output of the first combiner selector 216 is operatively coupled to the input of a first channel combiner antenna 220, which provides the input to a first shaping filter 224.

Data from the first shaping filter 224 is provided to a first configurable delay 228 (also known as a programmable delay). The first configurable delay 228 allows the transmit modem block 110 to compensate for delays that may manifest itself as a result of data propagating through other processors or clock distribution inaccuracies. This first configurable delay 228 allows the processor 105 to synchronize its time base to the time base of other processors.

The first configurable delay 228 is operatively coupled to a first frequency shifter 232, which allows the transmit modem block 110 to set the operating frequency. For some embodiments, the first frequency shifter 232 allows the processor 105 to move from one operating frequency to another. In combination, the first configurable delay 228 and the first frequency shifter 232 provide a mechanism by which the processor 105 can synchronize both its time base and its frequency band to the time base and frequency band of other processors.

Data 234 from the first frequency shifter 232 propagates to a combiner 238 and a multiplexer (MUX) 246. The combiner 238 is operatively coupled to the RF RX1 120, thereby allowing the transmit modem block 110 to combine its own data 236 with incoming RF data at the RF RX1 120 to generate combined data 240. The combined data 240 is then input to a quadrature phase module 242, and subsequently provided to the MUX 246, which multiplexes the quadrature-phase-modulated combined data 244 and the frequency-shifted data 234. The multiplexed data is then transmitted via the RF TX1 125. The pathway between the first channel combiner 216 and the RF TX1 125 is referred to herein as the first data transmission pathway.

The second data transmission pathway comprises the second combiner selector 266. Data 268 from the second combiner selector 266 is input to a second channel combiner antenna 270, which subsequently provides the input 272 to a second shaping filter 274. Similar to the first data transmission pathway, the second data transmission pathway comprises a second configurable delay 278, which is operatively coupled to a second frequency shifter 282. Again, the second configurable delay 278 allows the processor 105 to synchronize its time base to the time base of other processors, while the second frequency shifter 282, which allows the transmit modem block 110 to set its operating frequency and, if necessary, to move from operating frequency to another. In combination, the second configurable delay 278 and the second frequency shifter 282 provide a mechanism by which the processor 105 can synchronize both its time base and its frequency band to the time base and frequency band of other processors. The data from the second frequency shifter 282 is then transmitted via the RF TX2 135. The frequency shifters 232, 282 further enables multi-band and/or multi-carrier frequency combing.

As shown in the transmit modem block 110 of FIG. 2, the configurable delays 228, 278, the frequency shifters 232, 282, and the combiner 238 allow the processor 105 to accurately aggregate its own modem data with incoming data from other processors, while operating synchronously with other processors.

Figure 3:
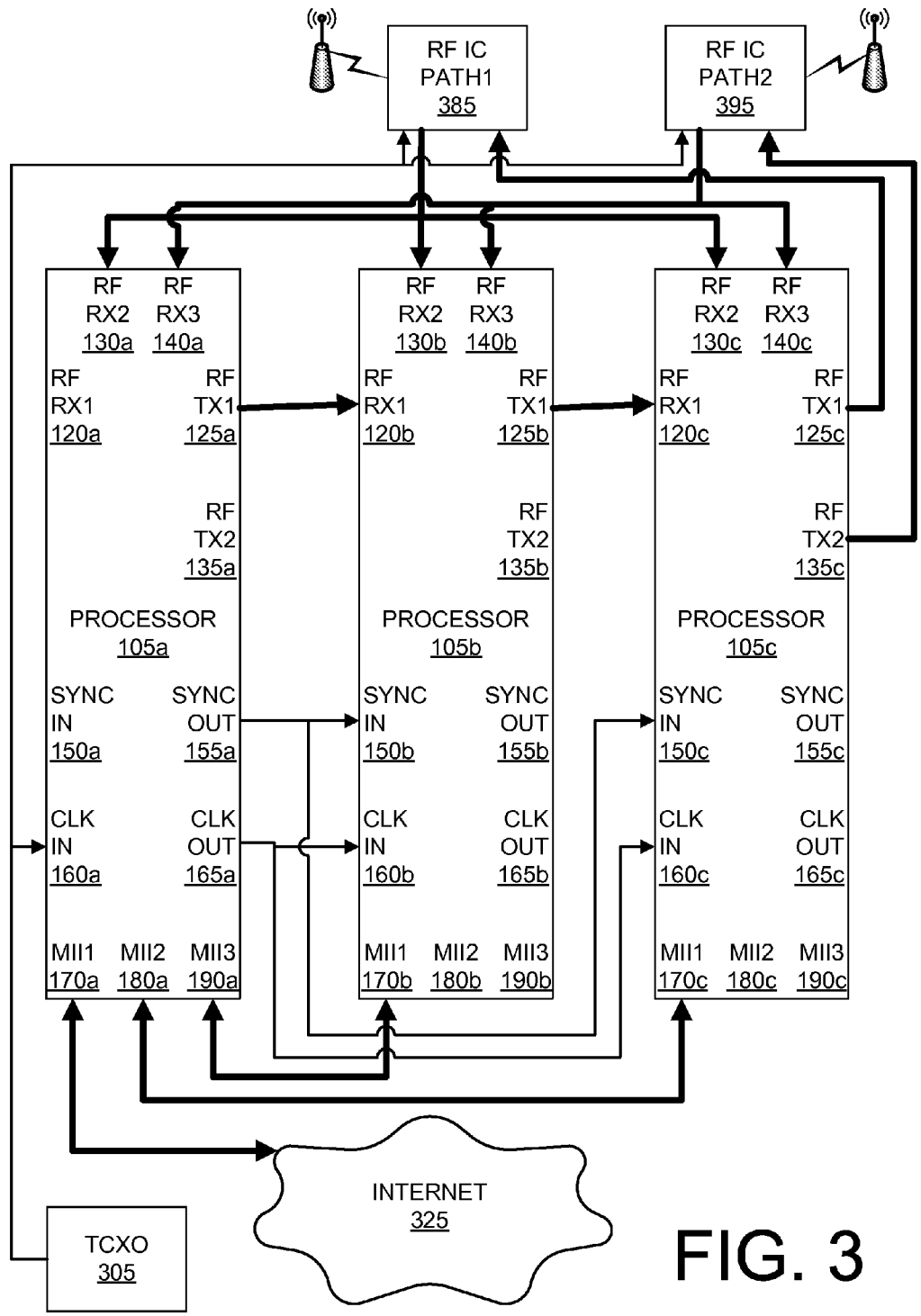
FIG. 3 is diagram showing one embodiment of a system where three processors of FIG. 1 are cascaded together.

FIG. 3 is diagram showing one embodiment of a system where three processors 105a, 105b, 105c of FIG. 1 are cascaded together. As shown in FIG. 1, one processor 105a serves as a master processor 105a, while the other two processors 105b, 105c serve as a first slave processor 105b and a second slave processor 105c.

The CLK IN 160a of the master processor 105a is operatively coupled to an external CLK source, which is shown as a temperature-controlled crystal oscillator (TCXO) 305 in the particular embodiment of FIG. 3. The TCXO 305, which preferably operates at 19.2 megahertz (MHz) or 26 MHz provides the clock signal to the master processor 105a. The MII1 170a of the master processor 105a is operatively coupled to a network (shown in FIG. 3 as the Internet 325), thereby allowing for backhaul data propagation through MII 170a.

The SYNC OUT 155a of the master processor 105a is operatively coupled to the SYNC IN 150b of the first slave processor 105b and the SYNC IN 150c of the second slave processor 105c. Additionally, the CLK OUT 165a of the master processor 105a is operatively coupled to the CLK IN 160b of the first slave processor 105b and the CLK IN 160c of the second slave processor 105c. The SYNC OUT 155a and the CLK OUT 165a signals from the master processor 105a allow the slave processors 105b, 105c to synchronize their respective time bases to the time base of the master processor 105a. This allows all three processors 105a, 105b, 105c to operate synchronously on all levels (e.g., chip phases, slots, frames, hyperframes, etc.), thereby acting as a single unit.

Recalling from FIG. 2, each processor 105a, 105b, 105c comprises configurable delays 228, 278 (FIG. 2), which permit the transmit modem block 110 to synchronize its respective processor's time base. Given that there are three processors 105a, 105b, 105c shown in FIG. 3, the master processor 105a would be programmed with zero delay, the first slave processor 105b would be programmed with a delay of N (which would be suitable to compensate for any propagation delay through the master processor 105a), and the second slave processor 105c would be programmed with a delay of 2N (which would be suitable to compensate for any propagation delay through both the master processor 105a and the first slave processor 105b).

The MII2 180a of the master processor 105a is operatively coupled to the MII1 170b of the first slave processor, which allows the master processor 105a to exchange data with the first slave processor 105b through the data ports 180a, I 70b. Similarly, the MII3 190a of the master processor 105a is operatively coupled to the MII1 170c of the second slave processor 105c, thereby allowing the master processor 105a to exchange data with the second slave processor 105c.

The RF RX2 130a is operatively coupled to a first RF integrated circuit (IC) path 385, while RF RX3 140a is operatively coupled to a second RF IC path 395. This dual-RX-antenna structure allows for RX diversity.

The RF TX1 125a of the master processor 105a is operatively coupled to the RF RX1 120b of the first slave processor 105b, so that the master processor 105a can provide its RF data to the first slave processor 105b.

Recalling from FIG. 2, the RF RX1 120b is operatively coupled to the RF TX1 120b through a combiner 238 (FIG. 2), thereby allowing the first slave processor 105b to combine its own modem data with the incoming RF data from the master processor 105a. As such, the transmit modem block 110 handles various aspects of the RAT Physical Layer 1, while the processor subsystem (such as, for example, a MIPS74K processor core) handles various aspects of the protocol stack (such as, for example, the upper RAT software layers).

Similar to the master processor 105a, the RF RX2 130b of the first slave processor 105b is operatively coupled to a first RF integrated circuit (IC) path 385, while RF RX3 140b of the first slave processor 105b is operatively coupled to a second RF IC path 395.

The RF TX1 125b of the first slave processor 105b is operatively coupled to the RF RX1 120c of the second slave processor 105c. Similar to the first slave processor 105b, the combiner 238 (FIG. 2) of the second slave processor 105c allows the second slave processor 105c to combine its own modem data with the incoming RF data from the first slave processor 105b. Recalling that the first slave processor 105b already aggregated its own modem data with the modem data from the master processor 105a, the data that is aggregated in the second slave processor 105c includes all of the data from the master processor 105a, the first slave processor 105b, and the second slave processor 105c. Again, the transmit modem block 110 of the second slave processor 105c handles various aspects of the RAT Physical Layer 1, while the processor subsystem handles various aspects of the protocol stack.

The RF TX1 125c of the second slave processor 105c is operatively coupled to the first RF IC path 385, while the RF TX2 135c of the second slave processor 105c is operatively coupled to the second RF IC path 395. Also, similar to the master processor 105a and the first slave processor 105b, the RF RX2 130c of the second slave processor 105c is operatively coupled to a first RF integrated circuit (IC) path 385, while RF RX3 140c of the second slave processor 105c is operatively coupled to a second RF IC path 395.

In the event that each processor 105 supports 32 3G/HSPA++ users, the cascaded architecture of three processors 105a, 105b, 105c, as shown in the embodiment of FIG. 3, allows a base station to support 96 3G/HSPA++ users using two TX and two RX antennas using only one RF chipset. In short, the first slave processor 105b and the second slave processor 105c behave only as modems and do not execute the upper layer RAT protocol stack functions. Instead, the master processor 105c handles the protocol stack (upper RAT layers) for all of 96 users. As one can appreciate, by synchronizing the internal clocks of the processors 105a, 105b, 105c and the operating frequencies of all of the processors 105a, 105b, 105c, a glue-less cascaded architecture can be created, thereby increasing the potential overall number of simultaneous users.

Figure 4:
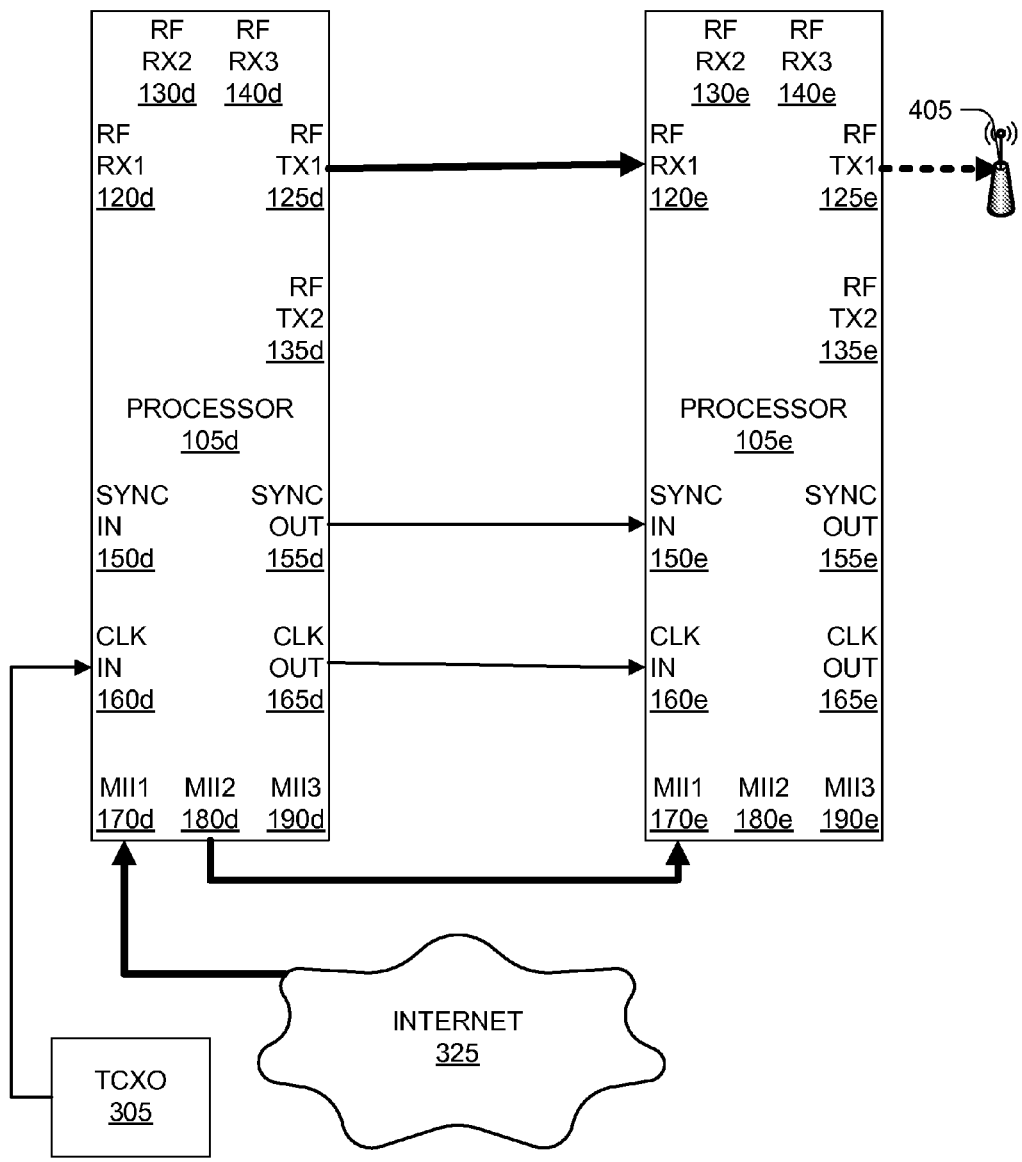
FIG. 4 is diagram showing one embodiment of a system where two processors of FIG. 1 are cascaded together.

FIG. 4 is diagram showing one embodiment of a system where two processors 105d, 105e of FIG. 1 are cascaded together. Specifically, the embodiment of FIG. 4 shows a dual-carrier operation over a single antenna, using a single RF chipset.

As shown in FIG. 4, a first processor 105d receives its CLK IN 160d from a TCXO 305, and performs backhaul data propagation to the network (e.g., Internet 325) through its MII1 170d. The MII2 180d of the first processor 105d is operatively coupled to the MII1 170e of the second processor 105e, thereby allowing data exchange between the first processor 105d and the second processor 105e.

The SYNC OUT 155d of the first processor 105e is operatively coupled to the SYNC IN 150e of the second processor, and the CLK OUT 165d of the first processor 105d is operatively coupled to the CLK IN 160e of the second processor 105e, thereby allowing the two processors 105d, 105e to synchronize their respective CLK to each other. For this particular embodiment, the frequency shifters 232, 282 (FIG. 2) of the first processor 105d are used for band-shifting, while the frequency shifters 232, 282 (FIG. 2) of the second processor 105e are used to centralize the two bands to the RF.

Insofar as the first processor 105d has the capacity to process 32 dedicated channels (DCH) users and 15 HSDPA, and the second processor 105e likewise has the capacity to process 32 DCH users and 15 HSDPA, the combined processors 105d, 105e can now fully support 64 users over one antenna using only one RF chipset.

Figure 5:
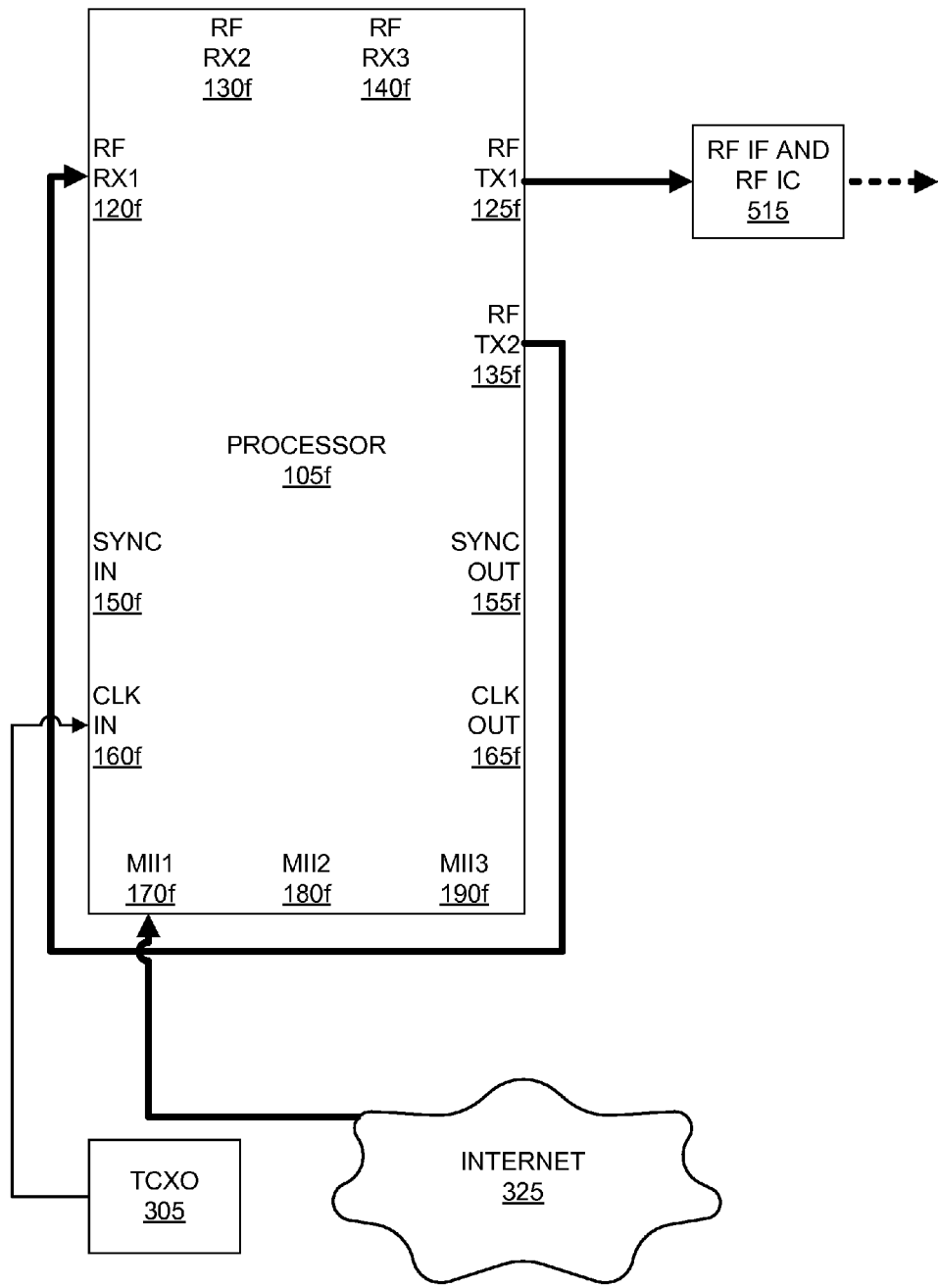
FIG. 5 is diagram showing one embodiment of a system using one processor of FIG. 1.

FIG. 5 is diagram showing one embodiment of a system using one processor 105f of FIG. 1. In the embodiment of FIG. 5, the second frequency shifter 282 (FIG. 2) associated with RF TX2 135f is used to shift the RF TX2 135f, thereby producing a dual-carrier effect. Thus, the combination of RF TX1 125f and RF TX2 135f allows the processor 105f to serve a dual-carrier base station over a single RF interface (IF) and RF IC 515.

For this embodiment, the CLK IN 160f again receives a clock signal from a TCXO 305, and the MII1 170f serves as the data port for backhaul data propagation. Unlike the embodiments of FIGS. 3 and 4, the embodiment of FIG. 5 shows the frequency-shifted RF TX2 135f being operatively coupled to the RF RX1 120f. Recalling that the RF RX1 120f can be combined with the RF TX1 125f through the combiner 238 (FIG. 2), the resulting RF TX1 125f is now a dual-carrier RF signal. Such a dual-carrier RF signal can be used in dual-carrier 3G operation or dual-carrier time-domain spatial code-division multiple access (TD-SCDMA) operation.

Figure 6:
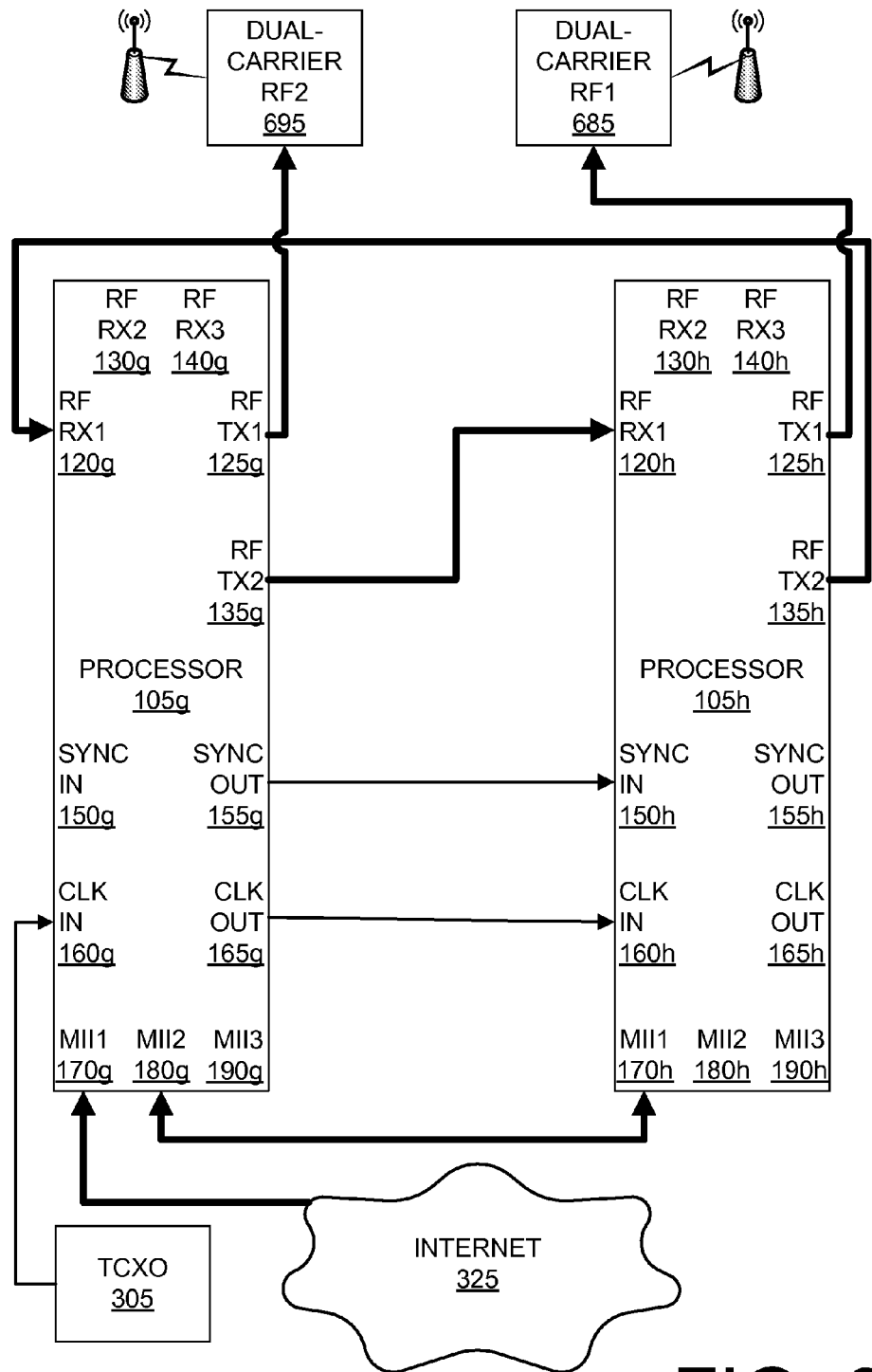
FIG. 6 is diagram showing another embodiment of a system where two processors of FIG. 1 are cascaded together.

FIG. 6 is diagram showing another embodiment of a system where two processors 105g, 105h of FIG. 1 are cascaded together. Unlike the two-processor configuration of FIG. 4, the two-processor embodiment of FIG. 6 shows the two processors 105g, 105h being cross-cascaded (or cross-coupled).

In the embodiment of FIG. 6, the MII1 170g of the first processor 105g is operatively coupled to the network (e.g., Internet 325) to handle the backhaul data propagation. Also, the first processor 105g receives the CLK IN 160g from the TCXO 305, and provides the SYNC OUT 155g and CLK OUT 165, thereby controlling the synchronization of the cascaded architecture.

The MII2 180g of the first processor 105g is operatively coupled to the MII1 170h of the second processor 105h, thereby permitting the processors 105g, 105h to exchange data through their respective data ports 180g, 170h.

In the cross-cascading embodiment of FIG. 6, the RF TX2 135g of the first processor 105g is operatively coupled to the RF RX1 120h of the second processor 105h. Conversely, the RF TX2 135h of the second processor is operatively coupled to the RF RX1 120g of the first processor 105h. Recalling from FIG. 2, the RF TX1 125g permits data combining with the RF RX1 120g in the first processor 105g, and the RF TX1 125h permits data combining with the RF RX1 120h in the second processor 105h. Thus, by cross-cascading the two processors 105g, 105h, the architecture of FIG. 6 enables full dual-carrier operation with MIMO when the RF TX1 125g transmits through one dual-carrier RF (designated in FIG. 6 as dual-carrier RF2 695), while RF TX1 125h transmits through another dual-carrier RF (designated in FIG. 6 as dual-carrier RF1 685).

As a specific example, if RF TX2 135g of the first processor 105g is shifted by +5 MHz, which is the bandwidth of a 3G carrier, and RF TX2 135h of the second processor 150h is shifted by −5 MHz, then RF TX 125g of the first processor 105g will transmit 10 MHz corresponding to one MIMO branch while the RF TX1 125h of the second processor 105h will transmit 10 MHz corresponding to another MIMO branch. Thus, the glue-less cross-cascading of two processors 105g, 105h enables simultaneous MIMO and DC-HSPA operation thus providing 84 mega-bits-per-second (Mbps) over 10 MHz and using only two single-chain RF transceivers.

Figure 7:
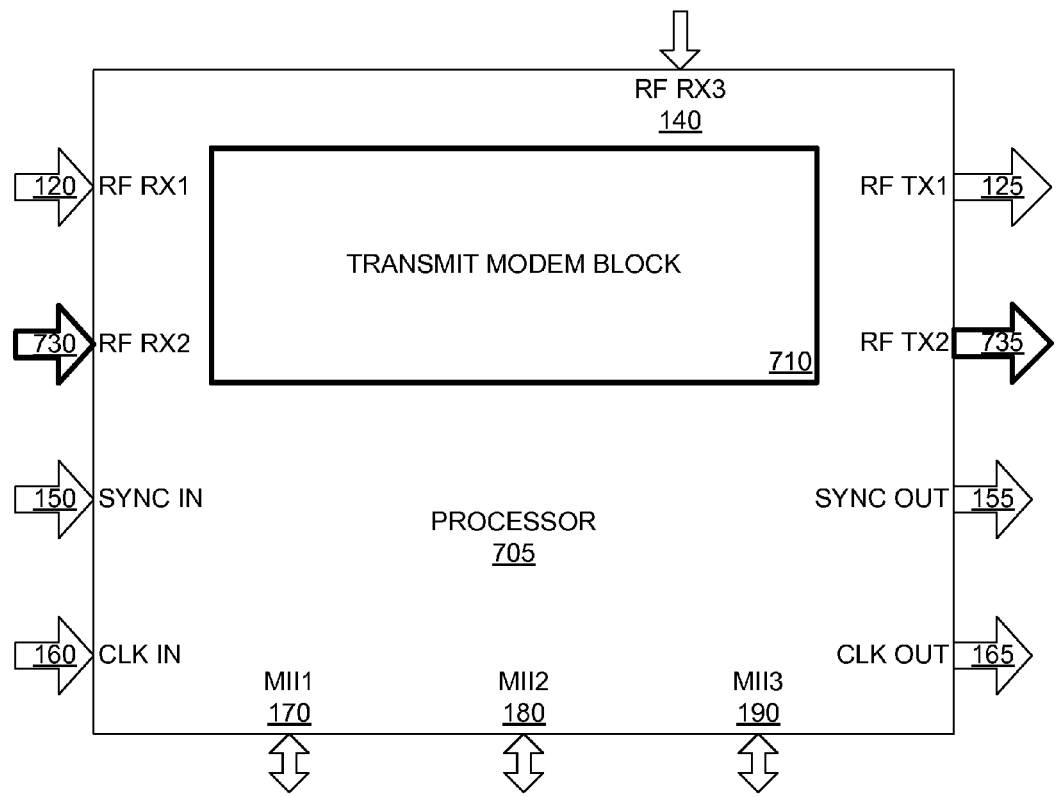
FIG. 7 is a diagram showing another embodiment of a baseband processor comprising a different transmit modem block.

FIG. 7 is a diagram showing another embodiment of a processor 705 comprising a different transmit modem block 710. Unlike the processor 105 of FIG. 1, the processor 705 of FIG. 7 comprises a RF TX2 735 that is operatively coupled to an RF RX2 730, similar to how the RF TX1 125 is operatively coupled to the RF RX1 120, thereby allowing both RF TX1 125 and RF TX2 735 to combine the processor's own modem data with incoming modem data. Insofar as the RF RX3 140, SYNC IN 150, SYNC OUT 155, CLK IN 160, CLK OUT 165, MII1 170, MII2 180, and MII3 190 have been described with reference to FIG. 1, a description of those components is omitted with reference to FIG. 7.

Figure 8:
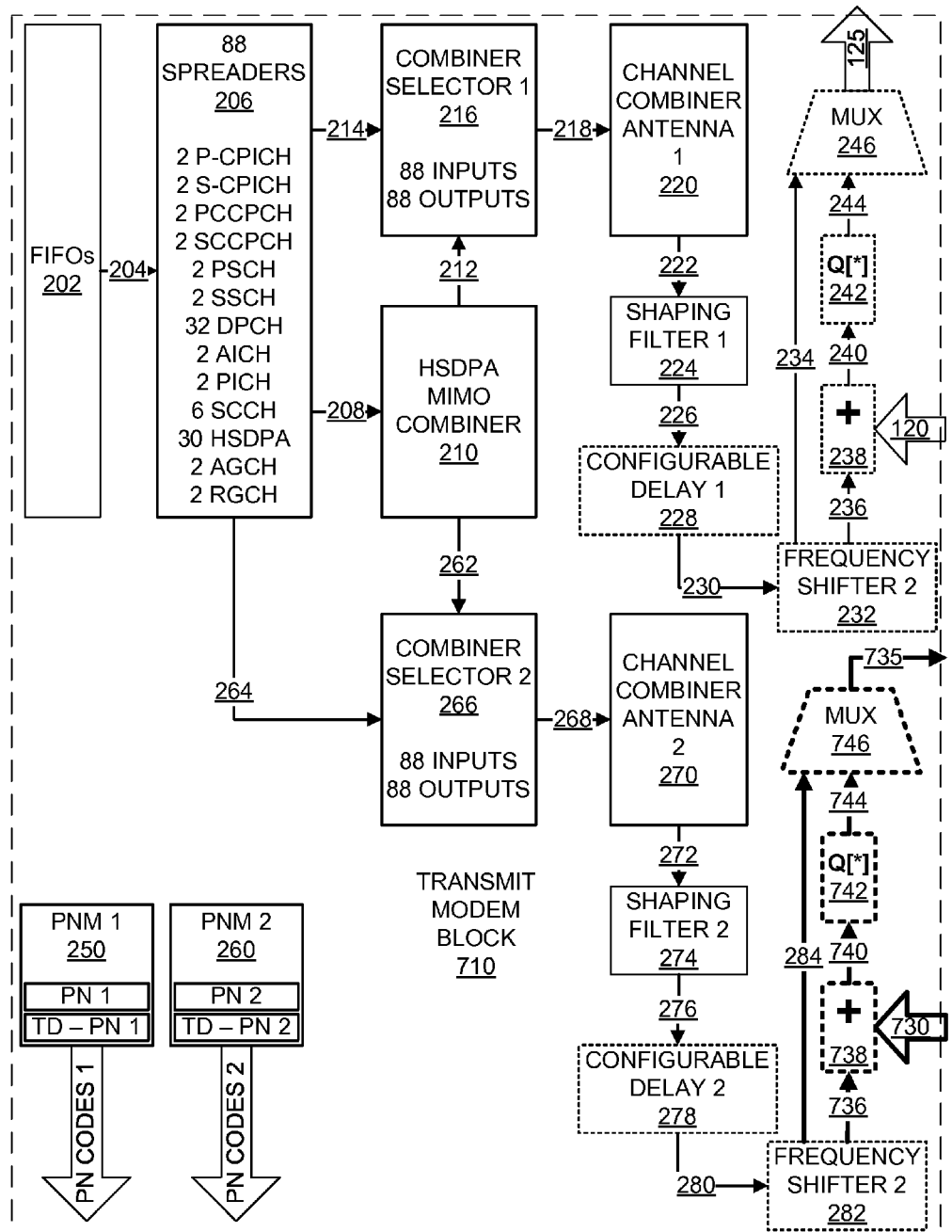
FIG. 8 is a diagram showing one embodiment of the transmit modem block of FIG. 7.

FIG. 8 is a diagram showing one embodiment of the transmit modem block 710 of FIG. 7. Unlike the transmit modem block 110 of FIG. 2, the transmit modem block 710 of FIG. 8 allows the processor 705 to combine its own modem data with incoming RF data through RF RX2 730. As such, the transmit modem block 710 comprises a second combiner 738, a second quadrature phase module 742, and a second MUX 746, in addition to all of the other components that have already been described with reference to FIG. 2 (e.g., FIFOs 202, spreaders 206, combiner selectors 216, 266, HSDPA MIMO combiner 210, channel combiner antennas 220, 270, shaping filters 224, 272, configurable delays 228, 278, frequency shifters 232, 282, etc.).

Similar to the first data transmission pathway, data 284 from the second frequency shifter 282 propagates to the second combiner 738 and the second MUX 746. The second combiner 738 is operatively coupled to the RF RX2 730, thereby allowing the transmit modem block 710 to combine its own data 736 with incoming RF data at the RF RX2 730 to generate combined data 740. The combined data 740 is then input to the second quadrature phase module 242, and subsequently provided to the MUX 246, which multiplexes the quadrature-phase-modulated combined data 744 and the frequency-shifted data 284. The multiplexed data is then transmitted via the RF TX2 735.

Figure 9:
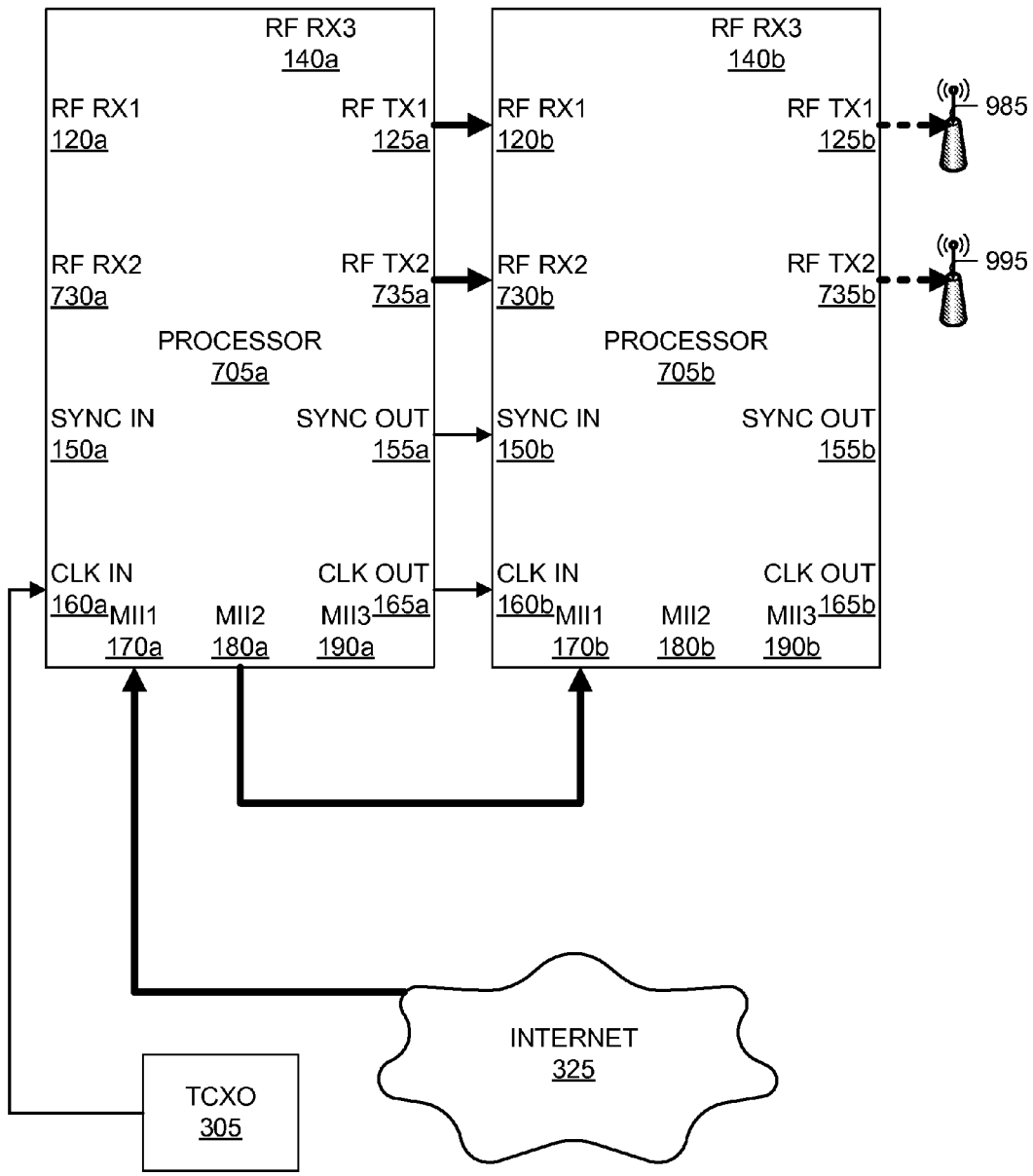
FIG. 9 is diagram showing one embodiment of a system where two processors of FIG. 7 are cascaded together.

As shown in FIG. 8, both RF TX1 125 and RF TX2 735 now permit aggregation of a processor's own modem data with incoming RF data from other processors. This type of processor architecture enables two multi-carrier MIMO operations, as shown in FIG. 9. As shown in FIG. 9, one embodiment of a two-processor system shows a master processor 705a receiving its CLK IN 160a from an external TCXO 305, and having its MII1 170a operatively coupled to a network (e.g., Internet 325) to allow for backhaul data propagation through MII 170a. The MII2 180a of the master processor 705a is operatively coupled to the MII1 170b of a slave processor 705b, thereby allowing data exchange over these data ports 180a, 170b, such as, for example, raw HSDPA data and/or DCH data.

The master processor 705a provides the SYNC IN 150b and the CLK IN 160b for the slave processor 705b, thereby allowing the slave processor 705b to synchronize its timing to the master processor 705a.

The RF TX1 125a of the master processor 705a is operatively coupled to the RF RX1 130b of the slave processor 705b, and the RF TX2 735a of the master processor 705a is operatively coupled to the RF RX2 730b of the slave processor 705b. Insofar as the slave processor 705b now has combiners 238, 738 (FIG. 8) for both RF TX1 125a and RF TX2 735a, the slave processor 705b is now able to combine its own modem data on both of the RF transmitters 125b, 735b. The combine data can then be transmitted through two separate RF interfaces 985, 995.

As shown through FIGS. 1 through 9, providing the ability to cascade multiple processors permits higher-capacity base stations, increased numbers of simultaneous users over one frequency band, and/or aggregation of several carriers while still using only one radio frequency (RF) chipset. This type of cascaded architecture can result in beneficial characteristics for certain RATs, such as DC-HSPA, Rel-9 HSPA, LTE-Advanced.

The processor 105, 705 may be implemented in hardware, software, firmware, or a combination thereof. In the preferred embodiment(s), the processor 105, 705 is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the processor 105, 705 is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. For example, while FIGS. 2 and 8 show very particular internal architectures for processors, it should be appreciated by one having skill in the art that other comparable components may be substituted for the particularly-recited components without materially affecting the invention. Additionally, while specific examples of 3G, HSPA+, and HSPA++ operations have been described, it should be appreciated by one having skill in the art that the disclosed embodiments can be implemented in other RAT, such as, for example, long-term evolution (LTE), LTE-Advanced, Rel 9 HSPA, DC-HSPA, etc. All such changes, modifications, and alterations should therefore be seen as within the scope of the disclosure.

What is claimed is:

1. A communication system, comprising:
    a first slave processor, comprising:
        a first data port to exchange data with a master processor;
        a first clock input to receive a master clock signal from the master processor;
        a first synchronization input to receive a synchronization signal from the master processor;
        a first configurable delay to synchronize a first slave processor clock to the master processor, the first slave processor clock being synchronized in response to the master clock signal and the synchronization signal;
        a first frequency shifter to set a first-slave-processor frequency;
        a first radio frequency receiver to receive radio frequency data from the master processor; radio frequency data of the first slave processor with the radio frequency data from the master processor to generate combined radio frequency data; and a first radio frequency transmitter operating at the first-slave-processor frequency, the first radio frequency transmitter to transmit the combined radio frequency data.

2. The system of claim 1, further comprising:
the master processor, comprising:
a first master data port to exchange data with the first slave processor;
a master clock input to receive a clock signal from an external clock source;
a master clock output to transmit the master clock signal;
a master synchronization output to transmit the synchronization signal;
a master frequency shifter to set a master processor frequency;
a master radio frequency transmitter operating at the master processor frequency, the master radio frequency transmitter to transmit the radio frequency data from the master processor.

3. The system of claim 2, wherein the first-slave-processor frequency is the same as the master processor frequency.

4. The system of claim 3, further comprising:
a second slave processor, comprising:
a second data port to exchange data with the master processor;
a second clock input to receive the master clock signal;
a second synchronization input to receive the synchronization signal;
a second configurable delay to synchronize a second-slave-processor clock to the master processor, the second-slave-processor clock being synchronized in response to the master clock signal and the synchronization signal;
a second frequency shifter to set a second-slave-processor frequency, the second-slave-processor frequency being the same as the master processor frequency;
a second radio frequency receiver to receive the combined radio frequency data;
a second combiner to combine radio frequency data of the second slave processor with the combined radio frequency data to generate further combined radio frequency data; and
a second radio frequency transmitter operating at the second-slave-processor frequency, the second radio frequency transmitter to transmit the further combined radio frequency data; and
a second master data port on the master processor, the second master data port to exchange data with the second slave processor.

5. The system of claim 2, wherein the master processor frequency is different from the first-slave-processor frequency.

6. The system of claim 5:
the first slave processor further comprising a second radio frequency transmitter to transmit first-slave-processor radio frequency data; and
the master processor further comprising:
a master radio frequency receiver to receive the first-slave-processor radio frequency data;
a master combiner to combine radio frequency data of the master processor with the first-slave-processor radio frequency data to generate master combined radio frequency data; and a second master radio frequency transmitter operating at the master processor frequency, the second master radio frequency transmitter to transmit the master combined radio frequency data.

7. The system of claim 1, the first slave processor, further comprising third radio frequency receiver to receive radio frequency data from the master processor;
a third combiner to combine radio frequency data of the first slave processor with the radio frequency data from the master processor to generate a third combined radio frequency data; and
a third radio frequency transmitter to transmit the combined third radio frequency data.

8. The system of claim 7, the master processor further comprising a second master radio frequency transmitter to transmit the radio frequency data from the master processor to a second radio frequency receiver of the first slave processor.

9. A method, comprising:
synchronizing a clock of a second processor to a clock of a first processor;
shifting a frequency of the second processor to a frequency of the first processor;
combining data from the first processor with data from the second processor; and
transmitting the combined data.

10. The method of claim 9, further comprising:
synchronizing a clock of a third processor to the clock of the first processor;
shifting a frequency of the third processor to the frequency of the first processor;
further combining data from the third processor with the combined data; and
transmitting the further combined data.

11. The method of claim 9, further comprising combining the data from the first processor and the data from the second processor in the second processor.

12. The method of claim 10, further comprising combining the data from the first processor and the data from the third processor in the third processor.

13. The system of claim 2, wherein the external clock signal is generated by a temperature-controlled crystal oscillator.

14. A system comprising:
a first processor comprising:
a first data port to exchange data with a second processor;
a first clock input to receive a clock signal from the second processor;
a first synchronization input to receive a synchronization signal from the second processor;
a first configurable delay to synchronize a first processor clock to the second processor, the first processor clock being synchronized in response to the clock signal and the synchronization signal;
a first frequency shifter to set a first processor frequency;
a first radio frequency receiver to receive radio frequency data from the second processor; radio frequency data of the first processor with the radio frequency data from the second processor to generate combined radio frequency data; and
a first radio frequency transmitter operating at the first processor frequency, the first radio frequency transmitter to transmit the combined radio frequency data.

15. The system of claim 14, wherein the second processor further comprises:

a second data port to exchange data with the first processor;

a second clock input to receive an external clock signal from an external clock source;

a second clock output to transmit the second clock signal;

a second synchronization output to transmit the synchronization signal;

a second frequency shifter to set a second processor frequency;

a second radio frequency transmitter operating at the second processor frequency, the second radio frequency transmitter to transmit the radio frequency data from the second processor.

16. The system of claim 15, wherein the first processor frequency is the same as the second processor frequency.

17. The system of claim 16, further comprising:

a third processor, comprising:

a third data port to exchange data with the second processor;

a third clock input to receive the second clock signal;

a third synchronization input to receive the synchronization signal;

a third configurable delay to synchronize a third processor clock to the second processor, the third processor clock being synchronized in response to the second clock signal and the synchronization signal; and a third frequency shifter to set a third processor frequency, the third processor frequency being the same as the second processor frequency.

18. The system of claim 17, wherein the first processor frequency is different from the third processor frequency.

19. The system of claim 15, wherein the external clock signal is generated by a temperature-controlled crystal oscillator.

* * * * *